(12) United States Patent
Stribling et al.

(10) Patent No.: US 10,857,626 B2
(45) Date of Patent: Dec. 8, 2020

(54) IMPROVING SERVICE LIFE OF PUMP FLUID ENDS

(71) Applicant: Halliburton Energy Services, Inc., Houston, TX (US)

(72) Inventors: David Mark Stribling, Duncan, OK (US); Benedict I Portillo, Duncan, OK (US); John Dexter Brunet, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/335,237

(22) PCT Filed: Oct. 21, 2016

(86) PCT No.: PCT/US2016/058030
§ 371 (c)(1),
(2) Date: Mar. 20, 2019

(87) PCT Pub. No.: WO2018/075055
PCT Pub. Date: Apr. 26, 2018

(65) Prior Publication Data
US 2019/0247957 A1 Aug. 15, 2019

(51) Int. Cl.
*B23K 26/356* (2014.01)
*F04B 15/02* (2006.01)
(Continued)

(52) U.S. Cl.
CPC ........ *B23K 26/356* (2015.10); *B23K 26/0006* (2013.01); *B24C 1/10* (2013.01);
(Continued)

(58) Field of Classification Search
CPC .... B23K 26/356; B23K 26/0006; C21D 7/06; C21D 10/005; F04B 15/02; F04B 47/00; F04B 53/14; F04B 53/164; F04B 53/02
See application file for complete search history.

(56) References Cited

U.S. PATENT DOCUMENTS 3,489,098 A   1/1970   Roth et al.
4,354,371 A * 10/1982   Johnson ................... B23P 9/00
                                                    72/53
(Continued)

OTHER PUBLICATIONS

International Search Roped & Written Opinion issued in Corresponding International Application No. PCT/US2010/058030 dated Jul. 17, 2017, (13 pages).

*Primary Examiner* — Thomas E Lazo
*Assistant Examiner* — Daniel S Collins
(74) *Attorney, Agent, or Firm* — McGuirewoods, LLP

(57) ABSTRACT

A pump fluid end includes a body that defines a plunger bore and a working fluid bore that intersects the plunger bore to form a cross bore. A packing bore is defined in the plunger bore and includes a packing sleeve bore, a taper relief bore, and a transition bore. The packing sleeve bore transitions to the taper relief bore at a radial shoulder and the taper relief bore transitions to the plunger bore across the transition bore. The transition bore extends between an external corner contiguous with the plunger bore and an internal corner contiguous with the taper relief bore and at least one of the external and internal corners is rounded and exhibits a radius. The packing bore is treated with a surface prestressing treatment.

18 Claims, 4 Drawing Sheets

(51) Int. Cl.
  *B23K 26/00*  (2014.01)
  *B24C 1/10*  (2006.01)
  *C21D 10/00*  (2006.01)
  *F04B 47/00*  (2006.01)
  *F04B 53/16*  (2006.01)
  *C21D 7/06*  (2006.01)

(52) U.S. Cl.
  CPC ............. *C21D 7/06* (2013.01); *C21D 10/005* (2013.01); *F04B 15/02* (2013.01); *F04B 47/00* (2013.01); *F04B 53/16* (2013.01)

(56) References Cited

U.S. PATENT DOCUMENTS

| | | | |
|---|---|---|---|
| 4,878,815 A | 11/1989 | Stachowiak | |
| 5,073,096 A | 12/1991 | King et al. | |
| 6,544,012 B1 | 4/2003 | Blume | |
| 6,623,259 B1 * | 9/2003 | Blume | F04B 53/007 137/543.23 |
| 2012/0141308 A1 * | 6/2012 | Saini | C08G 18/10 417/452 |
| 2013/0319220 A1 | 12/2013 | Luharuka et al. | |
| 2014/0271266 A1 | 9/2014 | Young | |
| 2016/0130679 A1 | 5/2016 | Cober et al. | |
| 2016/0208797 A1 | 7/2016 | Ladd et al. | |

* cited by examiner

IMPROVING SERVICE LIFE OF PUMP FLUID ENDS

BACKGROUND

It is common practice in the oil and gas industry to employ high-pressure positive displacement or reciprocating pumps in a variety of field operations relating to the exploration, preparation, and extraction of hydrocarbons. For example, such pumps are often used in cementing a wellbore as part of a completion operation. High-pressure pumps are also used in acidizing and hydraulically fracturing subterranean formation during wellbore treatment operations. The fluid end of such pumps is the portion of the pump where a working fluid is drawn in via a suction valve and subsequently discharged at an elevated pressure. Within the fluid end of a reciprocating high-pressure pump, a plunger or piston compresses the working fluid and forces it under pressure through a discharge valve. The discharge valve is typically designed to open when the pressure within the fluid end exceeds a predetermined pressure threshold.

During operation of pump fluid ends, the individual bores of the pump fluid end are subject to cyclic loading due to the alternating high and low pressures that are generated with each stroke of the plunger. Such cyclic loading weakens the material of the pump fluid end, which can result in progressive and localized structural damage in the form of microscopic or macroscopic cracks. Eventually such cracks can reach a critical size at which point the crack may propagate suddenly, resulting in fracturing of the pump fluid end.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to high-pressure pump fluid ends and, more particularity, to minimizing stress risers in pump fluid ends by modifying the geometry of the plunger bore and by treating autofrettaged portions of the fluid end with a surface pre-stressing treatment.

The embodiments provided herein describe improvements to pump fluid end processes and design features that extend the fatigue and service life of pump fluid ends. Example improvements include modifying the packing bore geometry to reduce stress, shot peening the modified packing bore, and shot peening autofrettaged portions of the pump fluid end, such as the cross bore region. It has been shown that shot peening the autofrettaged portions of the pump fluid end improves service life of the pump fluid ends in field testing. Moreover, improving the packing bore geometry may reduce stress and further enhance the service life of the pump fluid ends, which will reduce downtime and thereby save costs.

Figure 1:
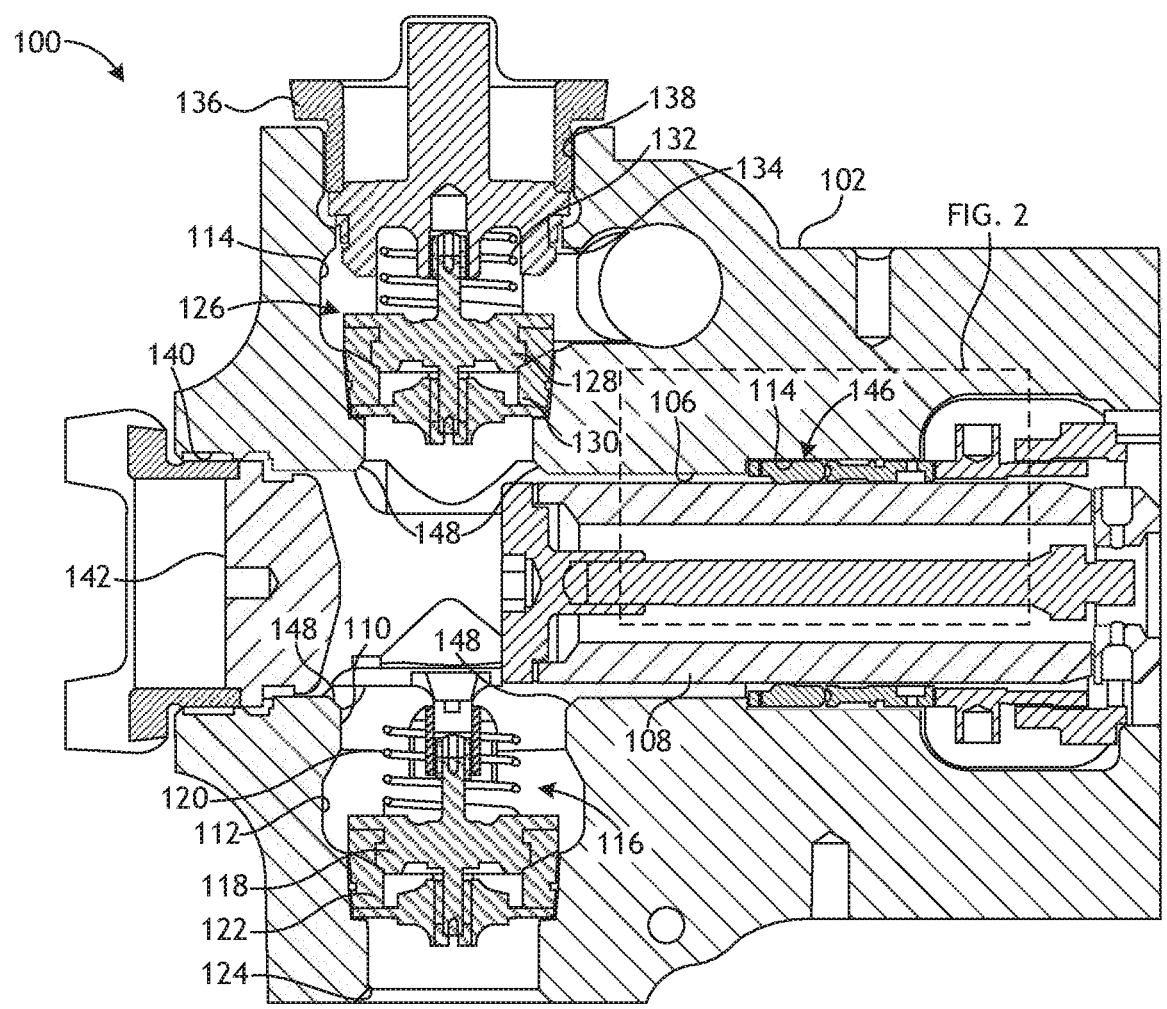
FIG. 1 is a cross-sectional view of an example pump fluid end.

FIG. 1 is a cross-sectional side view of an example pump fluid end 100 that can be used with a high-pressure positive displacement or reciprocating pump, according to one or more embodiments of the present disclosure. As illustrated, the pump fluid end 100 may comprise a body 102 that may be made from a single piece (or multiple pieces) of a metal material, such as, but not limited to, high tensile strength low alloy steel, martensitic stainless steels, martensitic precipitation hardening stainless steels, and nickel based corrosion resistant alloys.

The body 102 defines a plunger bore 106 and a plunger 108 is reciprocably positioned within the plunger bore 106. The plunger 108 is alternately referred to as a "piston." The body 102 further defines or otherwise provides a working fluid bore 110 that intersects and fluidly communicates with the plunger bore 106. The intersection location of the plunger and working fluid bores 106, 110 is generally referred to as the "cross bore" of the pump fluid end 102. In the illustrated embodiment, the working fluid bore 110 intersects the plunger bore 106 in a substantially perpendicular orientation. While the cross bore is depicted in FIG. 1 as being formed through orthogonally positioned plunger and working fluid bores 106, 110, in other embodiments, the working fluid bore 110 may be offset from perpendicular relative to the plunger bore 106. In such embodiments, for example, upper and lower portions of the working fluid bore 106 may extend from the plunger bore 106 at corresponding acute angles relative to a longitudinal axis of the plunger bore.

Within the working fluid bore 110, the body 102 defines a suction valve pocket 112 and a discharge valve pocket 114, each of which are in fluid communication with the plunger bore 106 at the intersection of the plunger bore 106 and the working fluid bore 110. While the discharge valve pocket 114 is depicted as being arranged within the working fluid bore 110 and otherwise axially aligned with the suction valve pocket 112, embodiments are also contemplated herein where the discharge valve pocket 114 is axially aligned with the plunger bore 106, without departing from the scope of the disclosure. In such embodiments, the cross bore may generally form a T-shape or a Y-shape. It is noted that regardless of the relative orientations of the plunger and working fluid bores 106, 110, the cross bore for the pump fluid end 100 refers to the location within the body 102 where the plunger and working fluid bores 106, 110 intersect and otherwise fluidly communicate.

The suction valve pocket 112 has an inlet valve assembly 116 arranged therein, and the inlet valve assembly 116 generally includes a suction valve 118 biased by a valve spring 120 against a suction valve seat 122. The body 102 further defines a suction inlet 124 through which a working fluid can be fed into the suction valve pocket 112 to be compressed. Example working fluids that may be compressed in the pump fluid end 100 include, but are not limited to, air, water, fracturing fluids, fracturing slurries (i.e., solid particles suspended in a fracturing fluid), acids, cements, drilling fluids, formation fluids (e.g., hydrocarbons), production fluids, and any combination thereof.

A discharge valve assembly 126 is arranged within the discharge valve pocket 114 and includes a discharge valve 128 positioned adjacent a discharge valve seat 130 and biased by a valve spring 132. A discharge outlet 134 is defined in the body 102 and in fluid communication with the discharge valve pocket 114. The discharge outlet 134 provides a fluid conduit through which pressurized working fluid may be discharged from the pump fluid end 100 for use. The valve spring 132 interposes the discharge valve 128 and a discharge valve cover 136 that is received and otherwise secured within a discharge cover orifice 138 defined in the body 102.

The body 102 may further define a suction orifice 140 (also known as a suction valve cover opening or cylinder head opening) in the front surface of the body 102. The suction orifice 140 may provide user access into the interior of the body 102 (e.g., into the cross bore). During operation, however, the suction orifice 140 will typically be occluded or capped off with a suction valve cover 142.

The plunger bore 106 provides and otherwise defines a recessed packing bore 144 configured to receive a seal packing assembly 146, alternately referred to as a "seal packing stack" or "seal packing arrangement." The seal packing assembly 146 is configured to be positioned about the plunger 108 and provides a dynamic sealing engagement between the inner wall of the recessed packing bore 144 and the plunger 108. To facilitate a dynamic sealing engagement, the seal packing assembly 146 can include one or more seals, sealing elements, or seal devices, which may be made of a variety of materials including, but not limited to, an elastomeric material, a rubber, a metal, a composite, a ceramic, a polymer, any derivative thereof, and any combination thereof. Those skilled in the art will readily appreciate the various configurations that the seal packing assembly 146 may provide. As the plunger 108 reciprocates within the plunger bore 106, the seal packing assembly 146 prevents the working fluid circulating through the working fluid bore 110 from migrating along the exterior surface of the plunger 108 and out of the body 102 via the plunger bore 106.

In exemplary operation of the pump fluid end 100, working fluid enters the body 102 via the suction inlet 124 and is conveyed toward the inlet valve assembly 116 arranged in the suction valve pocket 112. The plunger 108 is powered to reciprocate toward and away from the intersection of the plunger and working fluid bores 106, 110 (i.e., the cross bore) in order to pressurize the incoming working fluid. Reciprocating movement of the plunger 108 results in high and low pressures within the discharge valve pocket 114. As the plunger 108 is thrust toward the intersection of the bores 106, 110, the pressure within the discharge valve pocket 114 increases and, at some point, the pressure becomes sufficient to overcome the force of the valve spring 132 (and any pressure force on the other side of the discharge valve 128) to open the discharge valve 128. Once the discharge valve 128 is opened, the pressurized working fluid is discharged from the discharge valve pocket 114 via the discharge outlet 134. The amount of pressure required to open the discharge valve 128 is determined, at least in part, by the valve spring 132, which maintains the discharge valve 128 in its closed position until the requisite pressure is achieved in the discharge valve pocket 114.

The plunger 108 also generates a low pressure within the body 102 as it retracts away from its advanced position near the intersection of the bores 106, 110. As the plunger 108 retracts, the pressure at the cross bore decreases, which decreases the pressure within the discharge valve pocket 114 and the combination of discharge pressure downstream of the discharge valve 128 and the valve spring 132 forces the discharge valve 128 to close. As the plunger 108 continues to move away from the discharge valve pocket 114, the pressure at the cross bore will continue to drop, and eventually a low or negative pressure will be achieved within the body 102. This pressure decrease will eventually be sufficient to allow the pressure on the upstream side of the suction valve 118 to open the suction valve 118, which will force the uptake of working fluid into the suction valve pocket 112. The amount of upstream pressure required to open the suction valve 118 may be determined, at least in part, by the valve spring 120, which keeps the suction valve 118 in its closed position until the requisite upstream pressure force overcomes the spring force and the pressure force in the suction valve pocket 112.

Accordingly, the reciprocating or cycling motion of the plunger 108 within the plunger bore 106 controls fluid flow rate and the fluid resistance downstream of the discharge valve 128, and thereby controls the discharge pressure. The discharge pressure controls the pressure within the body 102. The suction and discharge valves 118, 128 respond accordingly in order to dispense pressurized working fluid from the discharge valve pocket 114 and replace the discharged working fluid with additional working fluid via the suction inlet 124.

Reciprocating pump fluid ends can experience fatigue crack failures due to the cyclic nature of the pressure loading during operation. Each stroke of the plunger 108, for example, causes the pressure within the bores 106, 110 to increase from near-zero to the discharge pressure, and then back to near-zero. Cross bore geometry creates a stress concentration that is greatest at the corners 148 (i.e., the intersection of the plunger and working fluid bores 106, 110) of the cross bore. When cyclically loaded, the stress at the cross bore can exceed the endurance limit of the material. When the material has been subjected to a finite number of cycles above the endurance limit, then crack initiation and subsequent failure is likely at or near one or more of the corners 148. One way to help prevent the initiation and propagation of fatigue cracks at the corners 148 (and other locations in the fluid end 100) is to pre-stress the cross bore region through a process known as "autofrettage."

Autofrettage is a metal fabrication technique in which internal surfaces of a metal material (e.g., the cross bore of the fluid end 100) are subjected to enormous pressure, causing internal portions of the material (e.g., at the corners 148) to yield plastically and result in internal compressive residual stresses once the pressure is released. When a fluid end treated with autofrettage is subsequently operated at pressure, the stress concentration is still in effect, however, the total stress is reduced by the residual compressive stress previously induced during autofrettage. Autofrettage has the benefit of impacting high stress areas and has shown three to ten times life improvement over as-machined fluid ends. Accordingly, the cross bore region of the body 102 can be subjected to autofrettage treatment to extend the service life of the fluid end 100.

With the advent of long-term pumping services using large volumes of salt water in shale fracturing, however, corrosion fatigue has become the primary mode of failure in pump fluid ends. Corrosives in the pumped working fluid cause corrosion pits to form, and the stress concentration of these pits form fatigue crack initiation sites that overcome the beneficial compressive stress of autofrettage, which can cause premature failures of fluid ends. Moreover, autofrettage offers little to no relief from stress as a result of stress risers in fluid end housings from machining imperfections such as micro tears and sharp bottom grooves in the machined surface. In fact, autofrettage could potentially amplify the stresses from such machining imperfections.

According to embodiments of the present disclosure, various autofrettaged surfaces of the fluid end 100 may also be subjected to a surface pre-stressing treatment to add additional compressive stresses to shallower portions of the material of the body 102. Suitable surface pre-stressing treatments can include, but are not limited to, shot peening, laser peening, and ultrasonic peening. Example surfaces of the fluid end 100 that may be autofrettaged and then subsequently treated with the surface pre-stressing treatment include, but are not limited to, the internal surfaces of the plunger and working fluid bores 106, 110 and, in particular, the corners 148 of the cross bore. Other surfaces of the fluid end 100 that may be autofrettaged and then subsequently treated with the surface pre-stressing treatment include the suction valve pocket 112 and the discharge valve pocket 114. In at least one embodiment, the autofrettaged surfaces of the fluid end 100 at or near the cross bore region may be shot peened to enhance the compressive stresses of the material.

Shot peening (or any of the other peening processes) is a cold working process that produces a compressive residual stress layer resulting in the modification of mechanical properties of the subject material. Shot peening affects the subject material to a shallower depth as compared to autofrettage. It entails impacting the subject material with shot (e.g., round metallic, glass, or ceramic particles) with a force sufficient to create plastic deformation. Each particle of the shot functions as a ball-peen hammer and spreads the material of the surface plastically, which causes changes in the mechanical properties of the surface. The plastic deformation induces a residual compressive stress in the peened surface, along with tensile stress a small distance into the material. Its main application is to avoid the propagation of micro cracks from a surface since such cracks have difficulty propagating in a material that is under a compressive stress and shot peening can create such a stress in the surface. Surface compressive stresses confer resistance to metal fatigue and to some forms of stress corrosion. Shot peening has shown to be a very effective method of reducing stress risers in the material of the fluid end 100 resulting from machining imperfections, such as micro tears and grooves in the machined surface.

In one or more embodiments, some or all of the autofrettaged surfaces of the pump fluid end 100, especially in the region of the cross bore, may be shot peened as a form of surface enhancement to retard and prevent crack nucleation. The residual compressive stresses resulting from shot peening do not penetrate as deep into the material as the stresses imparted by autofrettage, however, they increase the critical flaw size required to initiate a fatigue crack. Other non-autofrettaged portions of the pump fluid end 100 may also be shot peened, such as within the plunger bore 106 at the recessed packing bore 144, as will be discussed below.

The effectiveness or practicality of shot peening autofrettaged surfaces of the fluid end 100 was initially dismissed by the present inventors due to the differences in resulting residual stresses and concerns over possibly reliving stresses imparted by autofrettage. Previous pump fluid end failures, however, revealed the presence of what appeared to be micro cracks in the strained cross bores (e.g., at the corners 148) after autofrettage. The application of shot peening in these locations has shown to have mitigated the stress concentrating effects of these micro cracks, and shot peening all internal surfaces of the fluid end 100 (with the exception of sealing surfaces) has shown to mitigate stress concentrations resulting from machining processes and near surface inclusions.

As mentioned above, autofrettage pre-stresses a material deeper than the effects of shot peening. For example, autofrettage can pre-stress the material to a depth of about 0.5 inches, whereas shot peening pre-stresses the material to much shallower depths ranging between about 0.5 millimeters (mm) and about 1.0 mm. Accordingly, it is not intuitive that applying a shallow surface treatment (shot peening) on top of a deeper material treatment (autofrettage) would result in enhanced overall compressive stresses. Rather, one could surmise that such a process might result in the loss of residual stress with some relaxation of the material. However, upon testing the autofrettaged fluid end 100 following shot peening treatment, no obvious stress relaxation was observed and instead it was determined that the shallow shot peening treatment on top of the deep autofrettage treatment within the cross bore of the fluid end 100 enhanced fluid end corrosion fatigue resistance. More specifically, shot peening the autofrettaged (or swaged) surfaces of the fluid end 100 unexpectedly showed a significant increase in service life improvement as compared to autofrettaged surfaces of the fluid end 100 that were not shot peened but tested in similar service conditions. Accordingly, the combined effects on the service life of the pump fluid end 100 where internal surfaces are both autofrettaged and shot peening resulted in an unexpected gain in fatigue life.

Figure 2:
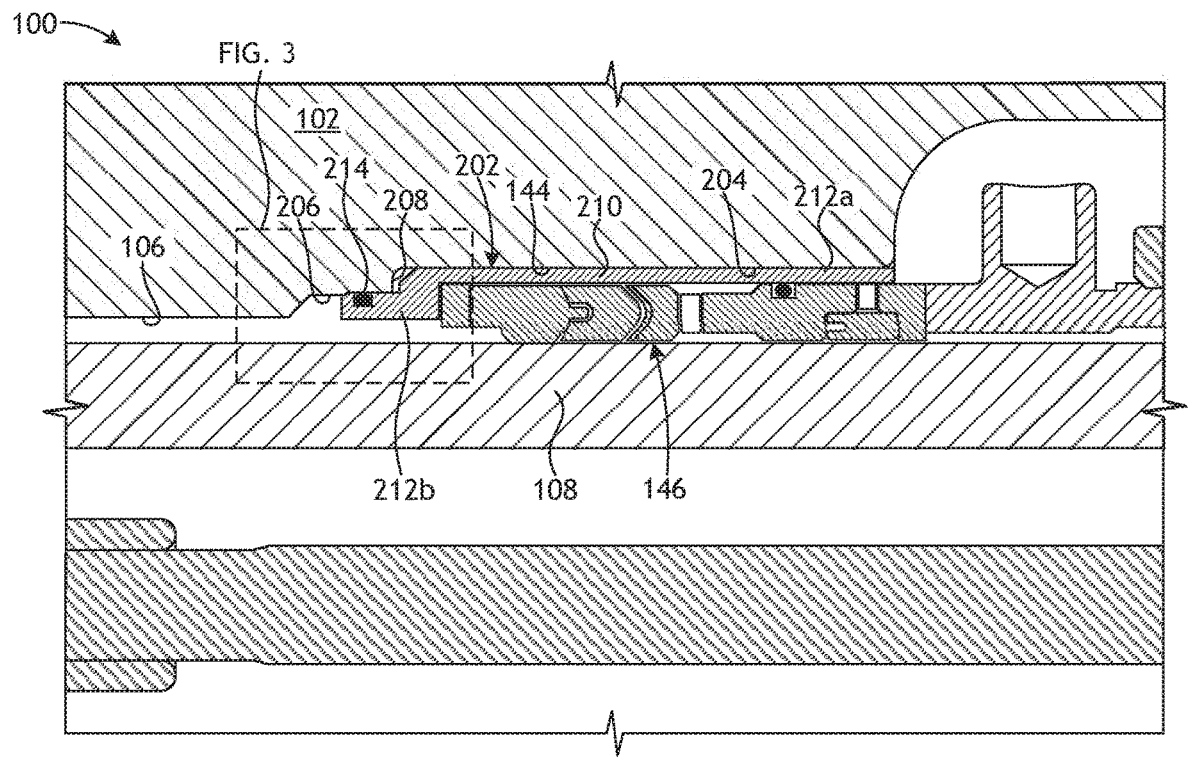
FIG. 2 is an enlarged cross-sectional side view of a portion of the fluid end of FIG. 1 as indicated by the dashed box in FIG. 1.

FIG. 2 is an enlarged cross-sectional side view of a portion of the fluid end 100 as indicated by the dashed box in FIG. 1. More particularly, illustrated is an enlarged view of the plunger bore 106 and the seal packing assembly 146 as positioned within one embodiment of the recessed packing bore 144. In the illustrated embodiment, the fluid end 100 includes a packing sleeve 202 interposing the seal packing assembly 146 and the inner wall of the packing bore 144. To accommodate the geometry of the packing sleeve 202, the packing bore 144 has been modified to define a packing sleeve bore 204 that transitions into a taper relief bore 206 at a radial shoulder 208.

The packing sleeve 202 comprises an annular body 210 that defines a main portion 212a and a nose portion 212b that extends axially from the main portion 212a. The main portion 212a of the body 210 is configured to be received within the packing sleeve bore 204 and the nose portion 212b is configured to be received within the taper relief bore 206. As illustrated, the main portion 212a exhibits an inner diameter sized to receive the seal packing assembly 146, and the inner diameter of the nose portion 212b is smaller than the inner diameter of the main portion 212a.

The packing sleeve 202 is a replaceable sleeve configured to receive and house the seal packing assembly 146. At least one seal element 214 (e.g., an O-ring or the like) may be used to seal the interface between the nose portion 212b and the taper relief bore 206 and may help reduce the pump-out force during pumping operations of the fluid end 100. In the illustrated embodiment, the seal element 214 is carried within a seal groove defined in the nose portion 212b, but could alternatively be carried in a seal groove defined on the inner surface of the taper relief bore 206, without departing from the scope of the disclosure. The geometry of the packing bore 144, including the packing sleeve and taper relief bores 204, 206, may be configured to receive the packing sleeve 202 via an interference or press fit engagement. Once the packing sleeve 202 is worn beyond a predetermined limit, it is removed from the pump fluid end 100 and replaced with a new packing sleeve.

Figure 3:
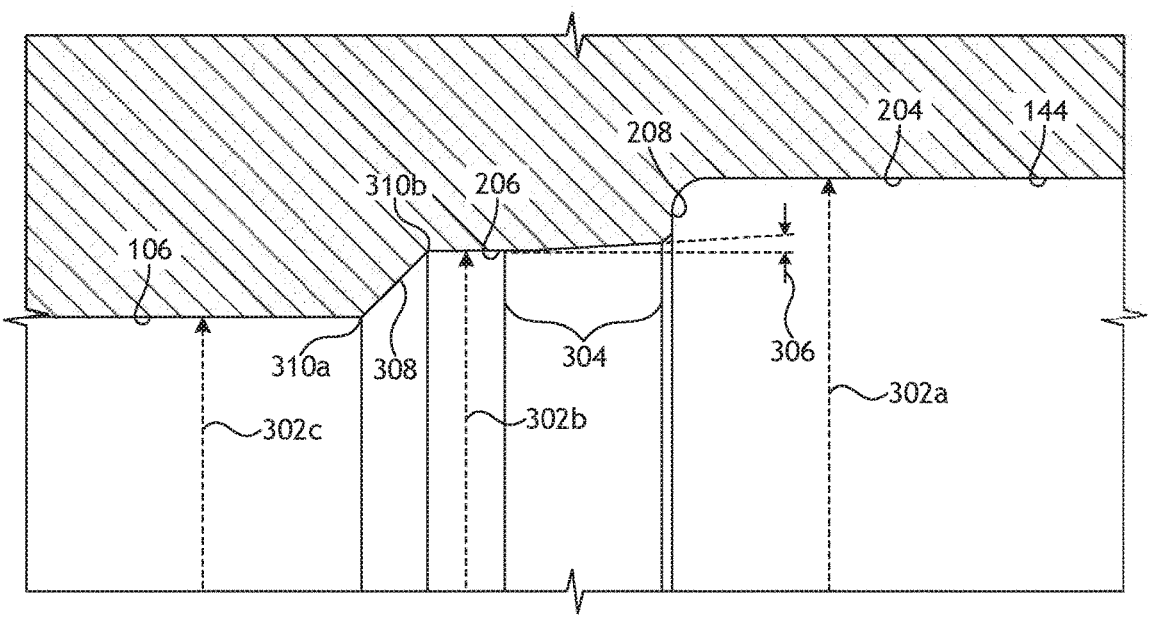
FIG. 3 is an enlarged cross-sectional view of the plunger bore and the packing bore as indicated by the dashed box in FIG. 2.

FIG. 3 is an enlarged view of the plunger bore 106 and the packing bore 144, as indicated by the dashed box in FIG. 2. The plunger 108, the seal packing assembly 146, and the packing sleeve 202 shown in FIG. 2 are all omitted from FIG. 3 for ease of viewing the plunger and packing bores 106, 144. As illustrated, the packing sleeve bore 204 exhibits a first diameter 302a, the taper relief bore 206 exhibits a second diameter 302b, and the plunger bore 206 exhibits a third diameter 302c, where 302c<302b<302a.

In the illustrated embodiment, the taper relief bore 206 defines and otherwise provides a tapered region 304 that extends axially along a portion of the taper relief bore 206 and terminates at the radial shoulder 208. The magnitude of the second diameter 302b increases across the tapered region 304 in the direction toward the radial shoulder 208. As illustrated, the tapered region 304 tapers toward the radial shoulder 208 at an angle 306, where the angle 306 can range from 1° to about 10°. The tapered region 304 may be configured to accommodate a correspondingly tapered upper surface of the nose portion 212b (FIG. 2) of the packing sleeve 202 (FIG. 2).

The plunger bore 106 transitions to the taper relief bore 206 (or relief bore adjacent to the taper) across a transition bore 308 that extends between an external corner 310a that is contiguous with the plunger bore 106 and an internal corner 310b that is contiguous with the taper relief bore 206. As illustrated, the external corner 310a is convex while the internal corner 310b is concave. Moreover, the external and internal corners 310a,b are each depicted in FIG. 3 as exhibiting "sharp" convex and concave features, respectively. As used herein, the term "sharp" refers to an abrupt or sudden change of a structural feature (e.g., the corners 310a,b) from a first angle to a second angle that is different from the first angle. In other words, a "sharp" corner or feature exhibits a radius of zero. As illustrated in FIG. 3, for example, the sharp external corner 310a is defined by an abrupt or sudden transition from the angled trajectory of the plunger bore 106 to the angled trajectory of the transition bore 308. Similarly, the between the sharp internal corner 310b is defined by an abrupt or sudden transition from the angled trajectory of the transition bore 308 to the angled trajectory of the taper relief bore 206. The sharp (zero radius) corners 310a,b each produce a stress singularity resulting in near-infinite stress levels.

During testing of the autofrettaged fluid end 100 (FIG. 1) with shot peened surfaces, it became apparent that fatigue crack initiation sites migrated from the cross bore region (i.e., the intersection of the plunger and working fluid bores 106, 110 of FIG. 1) to the region adjacent the packing bore 144, including the transition bore 308 and the external and internal corners 310a,b. The region occupied by the transition bore 308 and the associated external and internal corners 310a,b is not typically pre-stressed using autofrettage since the stresses at pre-stress pressure in this region are below the yield strength of the material. Rather, the region occupied by the transition bore 308 and the associated external and internal corners 310a,b may be shot peened or swaged to receive beneficial compressive stressing. With the external and internal corners 310a,b exhibiting sharp features, however, shot peening or swaging may be inadequate to overcome the corrosion stresses induced by the working fluid settling in the bottom of the packing bore 106 at the transition bore 308 while the pump fluid end 100 (FIG. 1) sits idle at times during pumping operations.

According to one or more additional embodiments of the present disclosure, the geometry of the external and internal corners 310a,b at the packing bore 144 may be modified to reduce the stress concentration factor in the region occupied by the transition bore 308. More specifically, the sharp features of the external and internal corners 310a,b may be modified with rounded or radiused features, which serve to spread the fatigue stresses across a larger surface area as opposed to being concentrated at the sharp or abrupt bore transitional locations, as discussed below with reference to FIGS. 5A and 5B.

Figure 4:
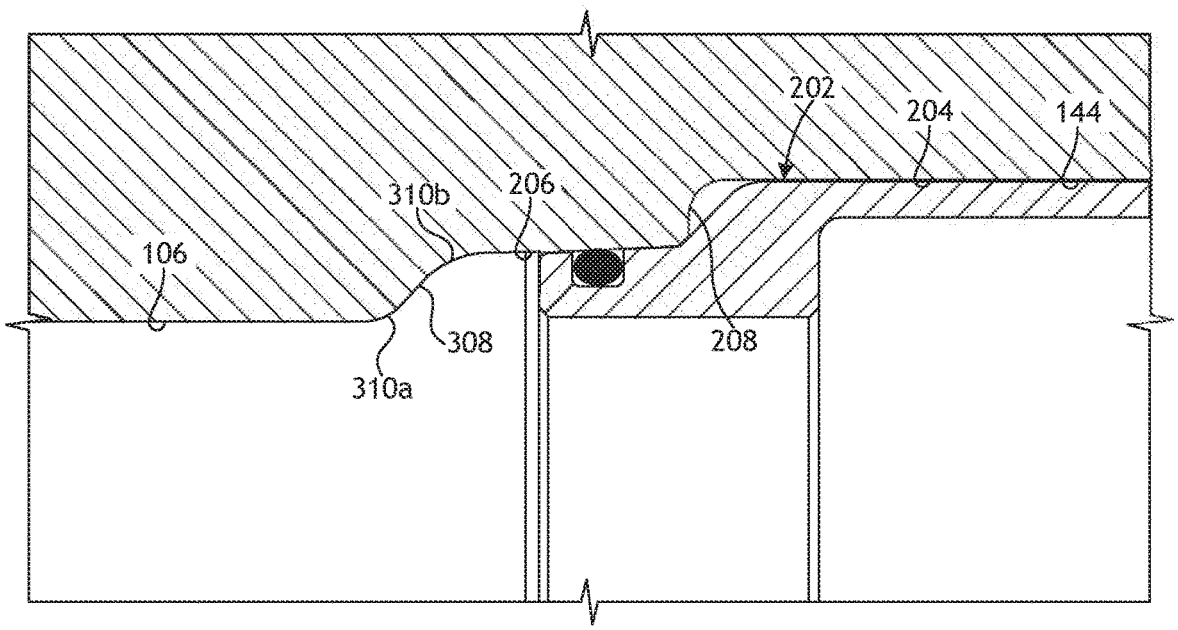
FIG. 4 is an enlarged cross-sectional view of the plunger bore and the packing bore showing an example embodiment.

FIG. 4 is an enlarged view of the plunger bore 106 bore and the packing bore 144, according to one or more embodiments of the disclosure. As with the embodiment of FIG. 3, the packing bore 144 is modified to accommodate the packing sleeve 202 and includes the packing sleeve and taper relief bores 204, 206. Moreover, the plunger bore 106 transitions to the taper relief bore 206 across the transition bore 308, which extends between the external and internal corners 310a,b, and the taper relief bore 206 transitions to the packing sleeve bore 204 at the radial shoulder 208. Unlike the embodiment of FIG. 3, however, the packing sleeve 202 is depicted as received within the packing bore 144, as generally described above.

Moreover, unlike the embodiment of FIG. 3, the external and internal corners 310a,b in the depicted embodiment do not exhibit sharp features but instead exhibit rounded or radiused features. In order for the external corner 310a to exhibit a radius, material from the external corner 310a may be removed by machining and thereby eliminating any sharp features. In order for the internal corner 310b to exhibit a radius, material may be added to the internal corner 310b, such as by placing a weld at the internal corner 310b, and subsequently machining the weld to a curved shape or form without sharp features. In other embodiments, the internal corner 310b may simply be machined without adding material, without departing from the scope of the disclosure.

In the illustrated embodiment, the external corner 310a exhibits a radius of about 0.120 inches and the internal corner 310b exhibits a radius of about 0.250 inches. It will be appreciated, however, that the radii of the external and internal corners 310a,b may vary, depending on the application and will be primarily dictated by the geometry of the plunger and packing bores 106, 144, such as the magnitude of the second and third diameters 302b,c.

Since the taper relief bore 206 exhibits the second diameter 302b (FIG. 3) and the plunger bore 106 exhibits a smaller third diameter 302c (FIG. 3), stress risers generated at the external corner 310a (contiguous with the plunger bore 106) will be less than any stress risers generated at the internal corner 310b (contiguous with the taper relief bore 206). As a result, in at least some embodiments, the magnitude of the radius of the external corner 310a may be less than the magnitude of the radius of the internal corner 310b. In other embodiments, however, the magnitude of the radius of the external corner 310a may be greater than the magnitude of the radius of the internal corner 310b, without departing from the scope of the disclosure.

Once the external and internal corners 310a,b are modified to exhibit a radius, the region occupied by the transition bore 308 and the associated external and internal corners 310a,b may then be treated with a surface pre-stressing treatment. As discussed above, the surface pre-stressing treatment can include, but is not limited to, shot peening or an alternate peening technique (e.g., laser peening, ultrasonic peening, etc.). Besides spreading stresses across a larger surface area, the radiused or rounded external and internal corners 310a,b may also prove advantageous for shot peening operations. More specifically, it is easier to treat the surfaces of the transition bore 308 and the associated external and internal corners 310a,b by shot peening with rounded external and internal corners 310a,b. In contrast, the sharp external and internal corners 310a,b of FIG.

3 tend to block the trajectory of shot peening and otherwise make it more difficult to treat all surfaces of the packing bore 144 equally.

As shown in FIG. 4, the disclosed modifications to the geometry of the external and internal corners 310a,b do not require a redesign of the packing sleeve 202 or a specialized packing sleeve. Rather, the traditional packing sleeve 202 may be used, thereby reducing the cost of implementing such geometry modifications.

Figure 5A:
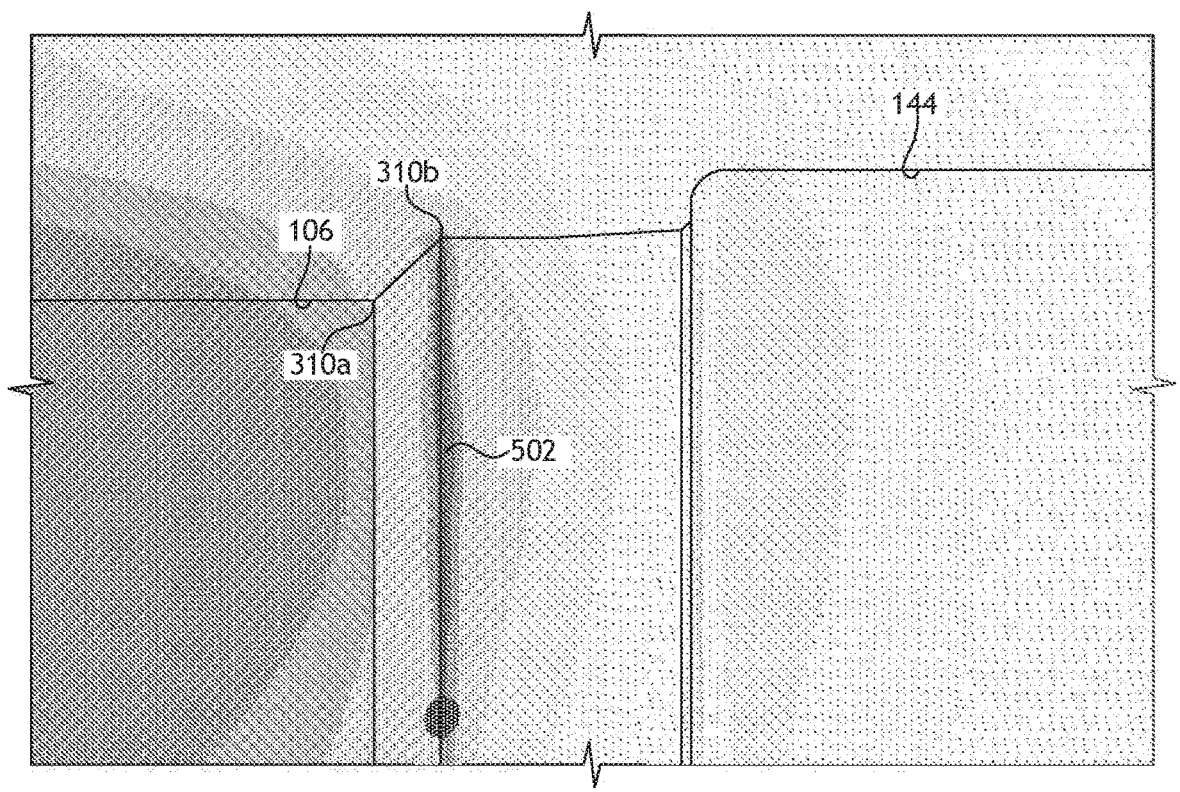
FIGS. 5A and 5B depict finite element analysis modeling results for the plunger and packing bore geometries shown in FIGS. 3 and 4, respectively.
Figure 5B:
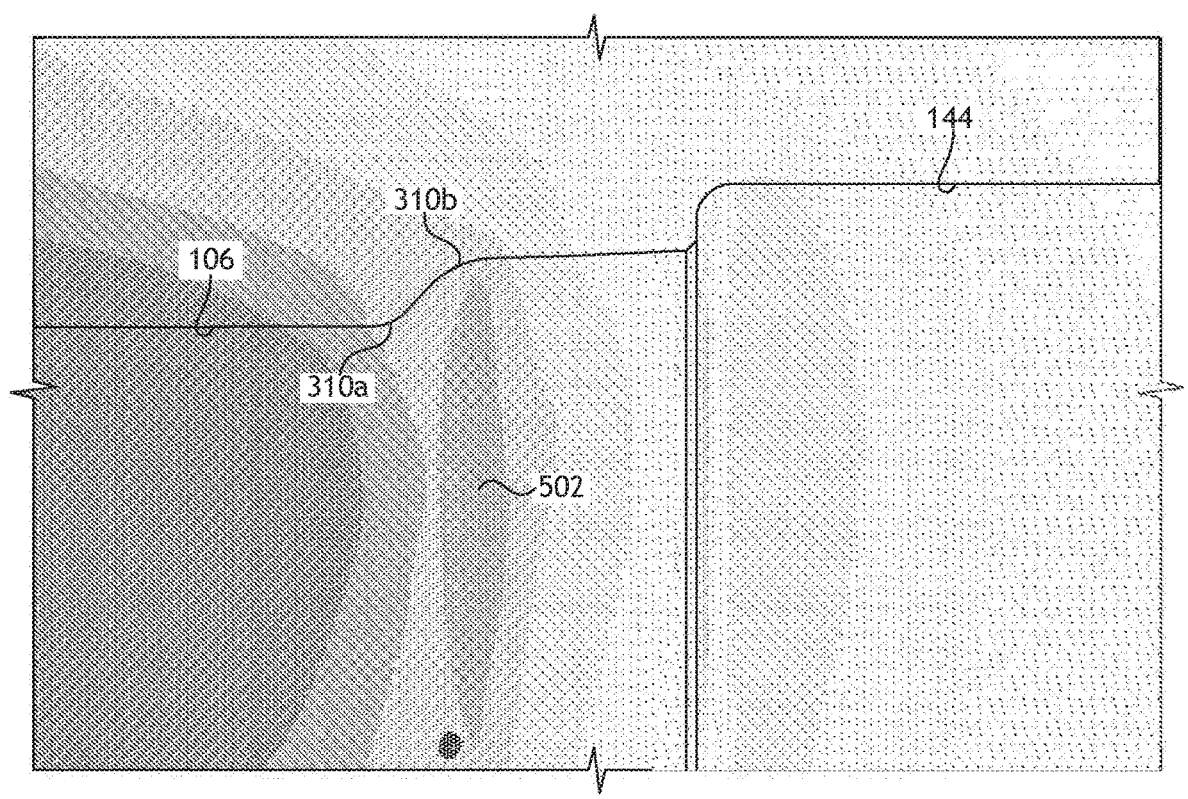

FIGS. 5A and 5B depict finite element analysis (FEA) modeling results for the plunger and packing bores 106, 144 reflective of the dissimilar geometries shown in FIGS. 3 and 4, respectively. More specifically, FIG. 5A provides FEA modeling results for the plunger and packing bores 106, 144 where the external and internal corners 310a,b exhibit sharp features, and FIG. 5B provides FEA modeling results for the plunger and packing bores 106, 144 where the external and internal corners 310a,b are rounded and otherwise exhibit a radius.

As depicted in FIG. 5A, a large amount of stress results at the sharp internal corner 310b during operation, as indicated at 502. In FIG. 5B, however, altering the geometry of the internal corner 310b to a rounded or radiused geometry diminishes the stress assumed at the internal corner 310b by about 17.5%, as indicated in the lighter shading of region 502.

Embodiments Disclosed Herein Include

A. A pump fluid end that includes a body that defines a plunger bore and a working fluid bore that intersects the plunger bore to form a cross bore, and a packing bore defined in the plunger bore and including a transition bore that extends between an external corner and an internal corner provided in the plunger bore. At least one of the external and internal corners is rounded and exhibits a radius, and wherein the packing bore is treated with a surface pre-stressing treatment.

B. A method of operating a pump fluid end that includes introducing a working fluid into a body of the pump fluid end, the body defining a plunger bore and a working fluid bore that intersects the plunger bore to form a cross bore, reciprocating a plunger within the plunger bore to compress the working fluid and discharge a compressed working fluid, wherein a packing bore is defined in the plunger bore and includes a packing sleeve bore, a taper relief bore, and a transition bore, the packing sleeve bore transitioning to the taper relief bore at a radial shoulder and the taper relief bore transitioning to the plunger bore across the transition bore, and wherein the transition bore extends between an external corner contiguous with the plunger bore and an internal corner contiguous with the taper relief bore and at least one of the external and internal corners is rounded and exhibits a radius, and mitigating stress fractures and cracks along the packing bore with a surface pre-stressing treatment applied to the packing bore.

C. A pump fluid end that includes a body, a plunger bore defined in the body, and a working fluid bore defined in the body and intersecting the plunger bore to form a cross bore within the body, wherein surfaces of the cross bore are treated by autofrettage and shot peening.

Each of embodiments A, B, and C may have one or more of the following additional elements in any combination: Element 1: wherein the packing bore further includes a packing sleeve bore and a taper relief bore, and wherein the packing sleeve bore transitions to the taper relief bore at a radial shoulder and the taper relief bore transitions to the plunger bore across the transition bore, the external corner being contiguous with the plunger bore and the internal corner being contiguous with the taper relief bore. Element 2: wherein the packing sleeve bore exhibits a first diameter, the taper relief bore exhibits a second diameter smaller than the first diameter, and the plunger bore exhibits a third diameter smaller than the second diameter. Element 3: wherein the surface pre-stressing treatment comprises at least one of shot peening, laser peening, and ultrasonic peening. Element 4: wherein the external and internal corners are each rounded and the radius of the external corner is smaller than the radius of the internal corner. Element 5: wherein the surface pre-stressing treatment comprises shot peening and each of the external and internal corners are shot peened. Element 6: wherein the cross bore is autofrettaged and treated with the surface pre-stressing treatment. Element 7: wherein the surface pre-stressing treatment comprises shot peening. Element 8: wherein the taper relief bore defines a tapered region that extends axially along a portion of the taper relief bore and terminates at the radial shoulder. Element 9: further comprising a packing sleeve received within the packing bore, and a seal packing assembly received by the packing sleeve and interposing the packing sleeve and an outer surface of a plunger positioned within the plunger bore.

Element 10: wherein the surface pre-stressing treatment comprises at least one of shot peening, laser peening, and ultrasonic peening. Element 11: wherein the external and internal corners are each rounded and the radius of the external corner is smaller than the radius of the internal corner. Element 12: wherein the cross bore is autofrettaged and the method further comprises mitigating stress fractures and cracks at the cross bore by shot peening the cross bore. Element 13: further comprising sealing the plunger bore with a seal packing assembly disposed about an outer surface of the plunger, wherein the seal packing assembly is received by a packing sleeve received within the packing bore and interposes the packing sleeve and the plunger.

Element 14: wherein the surfaces of the cross bore comprise corners at an intersection of the plunger and working fluid bores. Element 15: wherein the plunger and working fluid bores are oriented perpendicular to one another. Element 16: wherein the working fluid bore is offset from perpendicular relative to the plunger bore.

By way of non-limiting example, exemplary combinations applicable to A, B, and C include: Element 1 with Element 2; Element 4 with Element 5; and Element 6 with Element 7.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A pump fluid end, comprising:
a body that defines a plunger bore and a working fluid bore that intersects the plunger bore to form a cross bore; and
a packing bore defined in the plunger bore and including
a transition bore that extends between an external corner and an internal corner provided in the plunger bore,
wherein at least one of the external and internal corners is rounded and exhibits a radius, and wherein the packing bore is treated with a surface pre-stressing treatment,
wherein the external and internal corners are each rounded and the radius of the external corner is smaller than the radius of the internal corner.

2. The pump fluid end of claim 1, wherein the packing bore further includes a packing sleeve bore and a taper relief bore, and wherein the packing sleeve bore transitions to the taper relief bore at a radial shoulder and the taper relief bore transitions to the plunger bore across the transition bore, the external corner being contiguous with the plunger bore and the internal corner being contiguous with the taper relief bore.

3. The pump fluid end of claim 2, wherein the packing sleeve bore exhibits a first diameter, the taper relief bore exhibits a second diameter smaller than the first diameter, and the plunger bore exhibits a third diameter smaller than the second diameter.

4. The pump fluid end of claim 1, wherein the surface pre-stressing treatment comprises at least one of shot peening, laser peening, and ultrasonic peening.

5. The pump fluid end of claim 1, wherein the surface pre-stressing treatment comprises shot peening and each of the external and internal corners are shot peened.

6. The pump fluid end of claim 1, wherein the cross bore is autofrettaged and treated with the surface pre-stressing treatment.

7. The pump fluid end of claim 6, wherein the surface pre-stressing treatment comprises shot peening.

8. The pump fluid end of claim 1, wherein a taper relief bore defines a tapered region that extends axially along a portion of the taper relief bore and terminates at a radial shoulder.

9. The pump fluid end of claim 1, further comprising:
a packing sleeve received within the packing bore; and
a seal packing assembly received by the packing sleeve and interposing the packing sleeve and an outer surface of a plunger positioned within the plunger bore.

10. A method of operating a pump fluid end, comprising:
introducing a working fluid into a body of the pump fluid end, the body defining a plunger bore and a working fluid bore that intersects the plunger bore to form a cross bore;
reciprocating a plunger within the plunger bore to compress the working fluid and discharge a compressed working fluid, wherein a packing bore is defined in the plunger bore and includes a packing sleeve bore, a taper relief bore, and a transition bore, the packing sleeve bore transitioning to the taper relief bore at a radial shoulder and the taper relief bore transitioning to the plunger bore across the transition bore, and wherein the transition bore extends between an external corner contiguous with the plunger bore and an internal corner contiguous with the taper relief bore and at least one of the external and internal corners is rounded and exhibits a radius; and
mitigating stress fractures and cracks along the packing bore with a surface pre-stressing treatment applied to the packing bore.

11. The method of claim 10, wherein the surface pre-stressing treatment comprises at least one of shot peening, laser peening, and ultrasonic peening.

12. The method of claim 10, wherein the external and internal corners are each rounded and the radius of the external corner is smaller than the radius of the internal corner.

13. The method of claim 10, wherein the cross bore is autofrettaged and the method further comprises mitigating stress fractures and cracks at the cross bore by shot peening the cross bore.

14. The method of claim 10, further comprising sealing the plunger bore with a seal packing assembly disposed about an outer surface of the plunger, wherein the seal packing assembly is received by a packing sleeve received within the packing bore and interposes the packing sleeve and the plunger.

15. A pump fluid end, comprising:
a body;
a plunger bore defined in the body and comprising a transition bore that extends between an external corner and an internal corner provided in the plunger bore,
wherein the external and internal corners are each rounded and the radius of the external corner is smaller than the radius of the internal corner; and
a working fluid bore defined in the body and intersecting the plunger bore to form a cross bore within the body, wherein surfaces of the cross bore are treated by autofrettage and shot peening.

16. The pump fluid end of claim 15, wherein the surfaces of the cross bore comprise corners at an intersection of the plunger and working fluid bores.

17. The pump fluid end of claim 15, wherein the plunger and working fluid bores are oriented perpendicular to one another.

18. The pump fluid end of claim 15, wherein the working fluid bore is offset from perpendicular relative to the plunger bore.

* * * * *